(12) United States Patent
Cotran et al.

(10) Patent No.: US 11,681,855 B2
(45) Date of Patent: *Jun. 20, 2023

(54) AUTOMATED DYNAMIC DOCUMENT GENERATOR

(71) Applicant: Perry + Currier Inc., Toronto (CA)

(72) Inventors: Robert Cotran, Montreal (CA);
Christina S. Lee, Toronto (CA);
Thomas Andrew Currier, Toronto (CA)

(73) Assignee: PERRY + CURRIER INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/530,025

(22) Filed: Nov. 18, 2021

(65) Prior Publication Data
US 2022/0222415 A1     Jul. 14, 2022

Related U.S. Application Data

(63) Continuation of application No. 16/633,871, filed as application No. PCT/IB2018/055572 on Jul. 25, 2018, now Pat. No. 11,227,095.
(Continued)

(51) Int. Cl.
*G06F 40/00*     (2020.01)
*G06F 40/103*   (2020.01)
*G06F 40/186*   (2020.01)

(52) U.S. Cl.
CPC .......... *G06F 40/103* (2020.01); *G06F 40/186* (2020.01)

(58) Field of Classification Search
CPC .............................. G06F 40/103; G06F 40/186
See application file for complete search history.

(56) References Cited

U.S. PATENT DOCUMENTS 6,732,331 B1 * 5/2004 Alexander ............ G06F 40/117
                                                                707/E17.118
9,411,799 B2 * 8/2016 Hewett ................. G06F 40/186
(Continued)

OTHER PUBLICATIONS

Cotran, Robert et al., "Automated Dynamic Document Generator", U.S. Appl. No. 16/633,871, filed Jan. 24, 2020.

*Primary Examiner* — Shahid K Khan
(74) *Attorney, Agent, or Firm* — Perry + Currier (57) ABSTRACT

A method for automated dynamic document generation includes: storing, in a memory of a document generator, (i) a common pool of objects each defining document content and having respective object identifiers, (ii) a plurality of templates having respective template identifiers and containing respective template subsets of the object identifiers, and (iii) a plurality of master templates having respective master template identifiers and containing respective master template subsets of the object identifiers; establishing a connection to a data source; detecting document initiation data in the data source including a selected one of the template identifiers; responsive to the detection, retrieving a selected one of the master template identifiers associated with the selected template identifier; retrieving the template subset and the master template subset of objects corresponding to the selected template identifier and the selected master template identifier; and generating a document according to the template subset and the master template subset.

20 Claims, 8 Drawing Sheets

Related U.S. Application Data (60) Provisional application No. 62/536,563, filed on Jul. 25, 2017.

(56) References Cited

U.S. PATENT DOCUMENTS

| | | | |
|---|---|---|---|
| 2001/0014900 A1* | 8/2001 | Brauer | G06F 40/103 715/201 |
| 2001/0034849 A1* | 10/2001 | Powers | H04L 9/40 726/30 |
| 2004/0205573 A1* | 10/2004 | Carlson | G06F 40/143 715/237 |
| 2004/0205609 A1* | 10/2004 | Milton | G06F 16/9535 715/248 |
| 2005/0055635 A1* | 3/2005 | Bargeron | G06F 40/103 715/251 |
| 2005/0268227 A1* | 12/2005 | Carlson | G06F 40/186 715/223 |
| 2007/0106933 A1* | 5/2007 | Nene | G06Q 10/10 715/209 |
| 2007/0260971 A1* | 11/2007 | Rivas | G06F 40/131 |
| 2008/0028293 A1* | 1/2008 | Seliutin | G06F 16/93 707/999.001 |
| 2009/0019386 A1* | 1/2009 | Sweetland | G06F 40/186 715/765 |
| 2010/0010842 A1* | 1/2010 | Bank | G06Q 30/06 707/694 |
| 2011/0213783 A1* | 9/2011 | Keith, Jr. | G06F 16/954 707/741 |
| 2011/0296298 A1* | 12/2011 | Ahuja | G06F 16/972 715/248 |
| 2014/0258842 A1* | 9/2014 | Strong | G06F 16/986 715/234 |
| 2016/0253306 A1* | 9/2016 | Fan | G06F 3/0484 715/227 |
| 2018/0024986 A1* | 1/2018 | Singh | H04L 67/10 704/9 |

\* cited by examiner

From: docketing@abclawfirm.com
To: client123@innovativesolutions.com
Re: United States Patent Application No. 2253200 – Reporting Response to Office Action

Attention: Mr. Rubble, General Counsel

Dear Barney:

Re: United States Patent Application No. 2253200     620

Title:              Industrial Barometer
Applicant(s):       LESLEY TEST CORP.
Assignee:           None specified
PCK Professional:   John Smith

---

We have filed a response to the examination report for this application. For more information, please see the WHAT HAPPENED section below.

WHAT HAPPENED?

In accordance with your instructions, we have prepared and filed a response to the examination report dated June 25. 2018 by the deadline of December 25, 2018. ⟵ 625

A copy of the response, as filed, is attached for your review and records.

WHAT HAPPENS NEXT?

We will keep you informed of the progress of this matter.

If you have any questions, please contact John Smith.

Yours very truly,
ABC Law Firm

AUTOMATED DYNAMIC DOCUMENT GENERATOR

CROSS-REFERENCE TO RELATED APPLICATIONS

This application is a continuation of U.S. patent application Ser. No. 16/633,871, which claims priority from U.S. Provisional Patent Application No. 62/536,563, filed Jul. 25, 2017. The contents of the above-referenced documents are incorporated herein by reference.

FIELD

The specification relates generally to document generation, and specifically to a method, system and apparatus for automatically and dynamically generating documents.

BACKGROUND

Systems of various types can be configured to generate documents, e.g. for delivery to entities external to the system. Certain document content may appear in a number of different document types, which may lead to inefficient use of storage components, as well as inconsistent generation of such shared content.

SUMMARY

An aspect of the specification provides a method in a computing device for automated dynamic document generation, comprising: storing, in a memory of a document generator, (i) a common pool of objects each defining document content and having respective object identifiers, (ii) a plurality of templates having respective template identifiers and containing respective template subsets of the object identifiers, and (iii) a plurality of master templates having respective master template identifiers and containing respective master template subsets of the object identifiers; at the document generator, establishing a connection to a data source; at the document generator, detecting document initiation data in the data source including a selected one of the template identifiers; responsive to the detection, retrieving a selected one of the master template identifiers associated with the selected template identifier; retrieving the template subset and the master template subset of objects corresponding to the selected template identifier and the selected master template identifier; and generating a document according to the template subset and the master template subset of objects.

BRIEF DESCRIPTIONS OF THE DRAWINGS

Embodiments are described with reference to the following figures, in which.

DETAILED DESCRIPTION OF THE EMBODIMENTS

Figure 1:
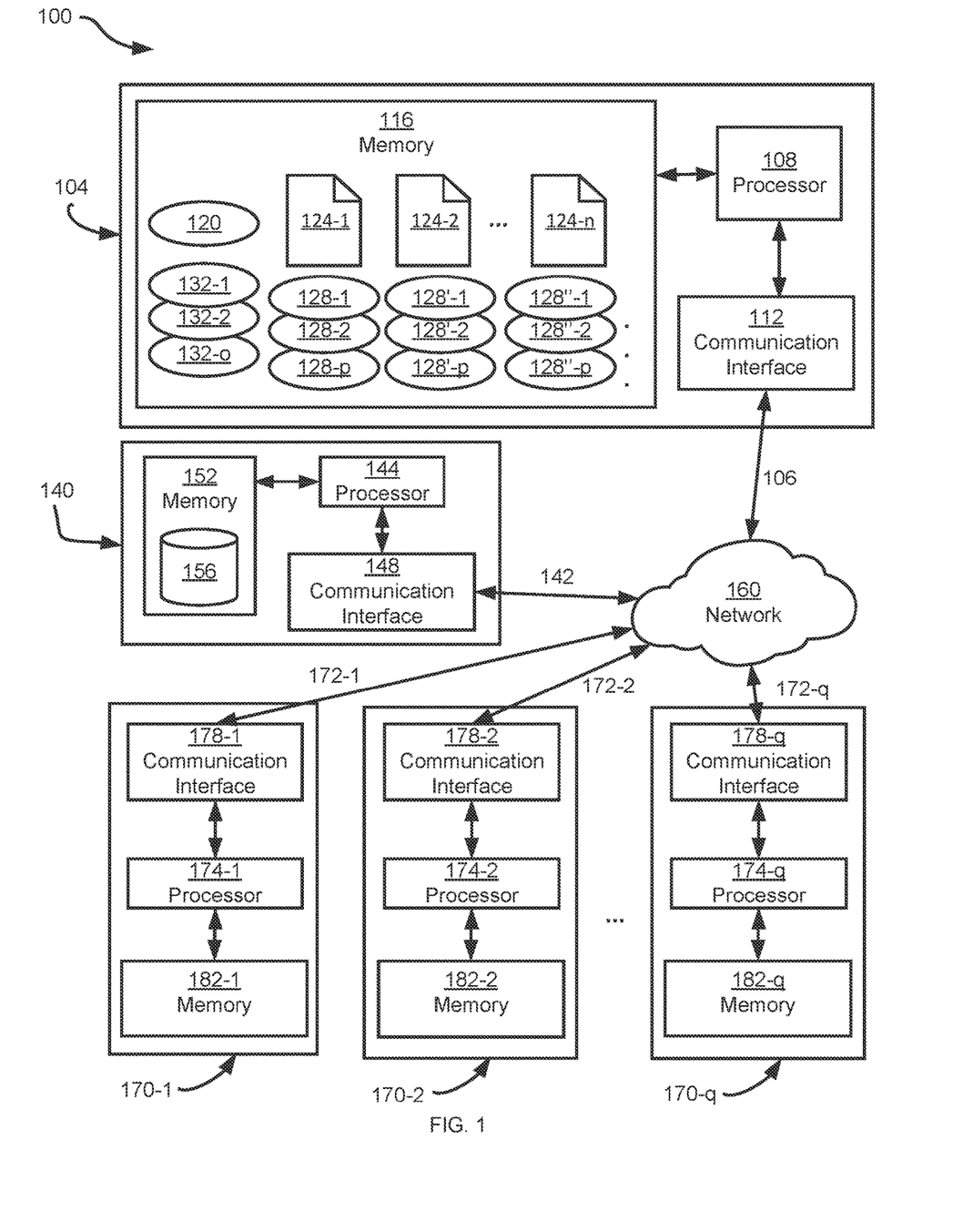
FIG. 1 depicts a system for automated dynamic document generation.

FIG. 1 depicts a system 100 for automated dynamic document generation. System 100 comprises a processing server 104, and a database server 140. Processing server 104 and database server 140 are coupled to at least one client device 170. In the present embodiment, a plurality of client devices 170-1, 170-2 . . . 170-$q$ are shown. Client devices 170 are referred herein generically as a client device 170 and collectively as client devices 170. This nomenclature is used elsewhere herein. Each client device 170 can be any of a cellular phone, a smart phone, a tablet computer, a desktop computer, a laptop computer, smart television, gaming console, virtual reality computing device, and the like.

Processing server 104 is connected to network 160 via data link 106. Database server 140 is connected to network 160 via data link 142. In turn, network 160 is connected to client devices via data links 172-1, 172-2, . . . 172-$q$. A person skilled in the art will recognize that data link 106, data link 142 and data links 172 are not particularly limited in their configuration and can be any one of, or any suitable combination of wired and wireless links. Network 160 can be any suitable combination of wired and wireless networks, including but not limited to a Wide Area Network (WAN) such as the Internet, a Local Area Network (LAN) such as a corporate data network, WiFi networks, cell phone networks (e.g. LTE) and the like.

As will be described in detail below, database server 140 provides a database 156 from which processing server 104 can retrieve data to generate documents. Processing server 104 operates to generate documents and to distribute the documents to respective client devices 170 to be displayed.

Processing server 104 includes a central processing unit (CPU) 108, also referred to herein as processor 108, interconnected with a memory 116. Memory 116 stores computer readable instructions executable by processor 108, including a document preparation application 120, at least one behavioral schema 132, at least one master template schema 124 and at least one template schema 128 all of which will be discussed in greater detail further below. Processor 108 and memory 116 are generally comprised of one or more integrated circuits (ICs) and can have a variety of structures, as will now occur to those skilled in the art (for example, more than one CPU can be provided). Processing server 104 also includes a communications interface 112 interconnected with processor 108. Communications interface 112 thus includes the necessary hardware, such as radio transmitter/receiver units, network interface controllers and the like, to communicate over link 106.

Master template schemas 124 each have master template identifiers to allow document preparation application 120 to identify and retrieve the corresponding master template schema 124 from processing server 104. Template schemas 128 also each have template identifiers to allow document preparation application 120 to identify and retrieve corresponding template schema 128 from processing server 104. Master template identifiers and template identifiers will be discussed in greater detail further below.

Processing server 104 executes the instructions of document preparation application 120 to perform, in conjunction with the other components of processing server 104, various functions related to the generation of documents to be sent to client devices 170. In the discussion below of those functions, it will be understood that processing server 104 is so configured via the processing of the instructions in document preparation application 120 by the hardware components of processing server 104 (including processor 108 and memory 116).

Database server 140 includes a central processing unit (CPU) 144, also referred to herein as processor 144, interconnected with a memory 152. Processor 144 and memory 152 are generally comprised of one or more integrated circuits (ICs), and can have a variety of structures, as will now occur to those skilled in the art (for example, more than one CPU can be provided).

Memory 152 stores database 156. In the present embodiment, database 156 is an electronic legal records database 156 containing case files representing government registrable intellectual property rights (IPR) from any suitable jurisdiction or combination of jurisdictions. IPRs include, without limitation, patents, trademarks, industrial designs, utility models and copyrights. In the present embodiment, the electronic legal records database is also a workflow engine that keeps track of deadlines of subsequent tasks within each case. In another version, database 156 can be electronic accounting records containing case files representing general ledgers comprised of transactions.

Each case within database 156 has a unique identifier. In the present embodiment of an electronic legal records database, the unique identifier is a case reference number. A case reference corresponds to a specific electronic legal record in database 156. For example, a case reference can be an application number for a patent application that has been filed at the United States Patent and Trademark Office (USPTO). Another example of a case reference can be the attorney docket file number such as those commonly employed in filing systems of law firms.

In the present embodiment, examples of data variables within an electronic legal records database include, without limitation, dates (e.g. records of previous events), deadlines (e.g. dates of future events be completed), names of inventors, applicants, and other parties to the case. A person skilled in the art will now recognize other examples of data variables that are associated with unique case reference identifiers.

Database server 140 also includes a communications interface 148 interconnected with processor 144. Communications interface 148 thus includes the necessary hardware, such as radio transmitter/receiver units, network interface controllers and the like, to communicate over link 142.

Although database server 140 and processing server 104 are discussed below as two distinct servers, in some embodiments they can be implemented in a single server, or in a greater number of servers than two.

Client devices 170 includes respective central processing units (CPU) 174-1, 174-2, . . . 174-$q$, also referred to herein as processors 174, interconnected with respective memories 182-1, 182-2, . . . 182-$q$. Processor 174 and memory 182 are generally comprised of one or more integrated circuits (ICs), and can have a variety of structures, as will now occur to those skilled in the art (for example, more than one CPU can be provided). Client devices 170 also includes respective communications interfaces 178-1, 178-2, . . . 178-$q$ interconnected with respective processors 174. Communications interface 178 thus includes the necessary hardware, such as radio transmitter/receiver units, network interface controllers and the like, to communicate over link 172.

Figure 2:
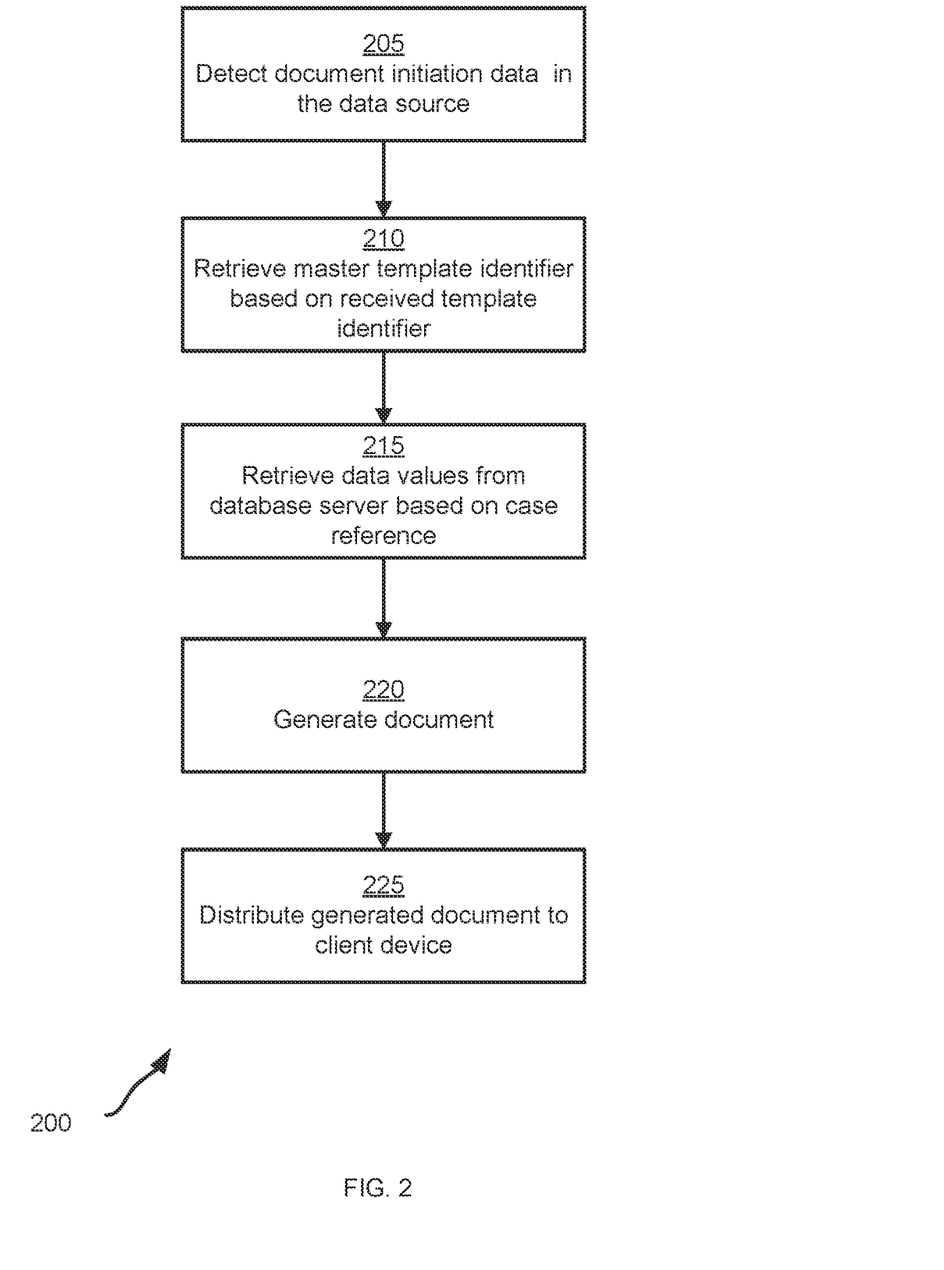
FIG. 2 depicts a method of automated dynamic document generation in the system of FIG. 1, according to a non-limiting embodiment.

Referring now to FIG. 2, a method 200 of automated dynamic document generation is illustrated. Method 200 will be described in conjunction with its performance by system 100. Specifically, method 200 is performed by processing server 104 via the execution of document preparation application 120.

Beginning at block 205, processing server 104 queries database 156 periodically for new data and detects document initiation data when available on database 156. In other embodiments, processing server 104 can query database 156 on a fixed schedule (e.g. 2:00 PM every day), or an application on database server 140 can create a queue of cases with document initiation data, which is retrieved periodically by processing server 104. Document initiation data includes at least a template identifier and a case reference number. As will be further discussed below in block 210, document preparation application 120 uses the template identifier to retrieve a corresponding template schema 128, and subsequently to determine the master template schema 124, and uses the case reference number to retrieve relevant case data from the database 156. In the present embodiment, document initiation data is generated as part of the workflow engine within database 156. For example, the receipt of a patent filing receipt from the USPTO will trigger the workflow engine to produce documentation initiation data for a reporting letter to the client (one of the parties on the case). The document initiation data includes the case reference number pertaining to the USPTO filing receipt and the template identifier for a reporting letter regarding the receipt of a USPTO filing receipt.

At block 210, document preparation application 120 on processing server 104 retrieves a master template identifier based on the corresponding template identifier retrieved in the document initiation data. Document preparation application 120 can identify the associated master template identifier at block 210 based on the template identifier retrieved at block 205 via a database table residing on database 156. The database table residing on database 156 has a list of each child template identifier and its corresponding parent master template identifier. In another embodiment, the database table with the corresponding parent master template identifiers and child template identifiers can reside on a database on processing server 104.

Within the database table, each master template identifier is associated to at least one template identifier. More specifically, each template identifier is associated to a parent master template identifier. Table 1 illustrates an example of the database table.

TABLE 1

Master Template Identifier to Template Identifier Relationship

| Master Template Identifier | Template Identifier |
|---|---|
| Reporting Letter | Reporting the receipt of a USPTO Filing Receipt |
| Reporting Letter | Reporting the filing of a response to a patent office action with the USPTO |
| Reminder Letter | Reminding client to provide instructions on response to a patent office action |
| Reminder Letter | Reminding client to provide instructions on payment of maintenance fees |

In the example above, where parent master template identifier is reporting letter master template identifier, then the children template identifiers are all event specific reporting letters, such as a reporting letter regarding the receipt of a USPTO filing receipt, or a reporting letter regarding the filing of a response to a patent office action with the USPTO. In another example, where the patent master template identifier is reminder letter master template identifier, then the children template identifiers are all event specific reminder letters, such as a reminder to provide instructions on the response to a patent office action, or a reminder to provide instructions on whether to pay maintenance fees on a case. A person skilled in the art will now be able to recognize the different combinations and sets of template identifiers and the corresponding master template identifiers.

At block 215, document preparation application 120 retrieves data variables from database server 140 for population into the proposed generated document. Document preparation application 120 determines the appropriate data variables to retrieve based on master template schema 124.

Figure 3A:
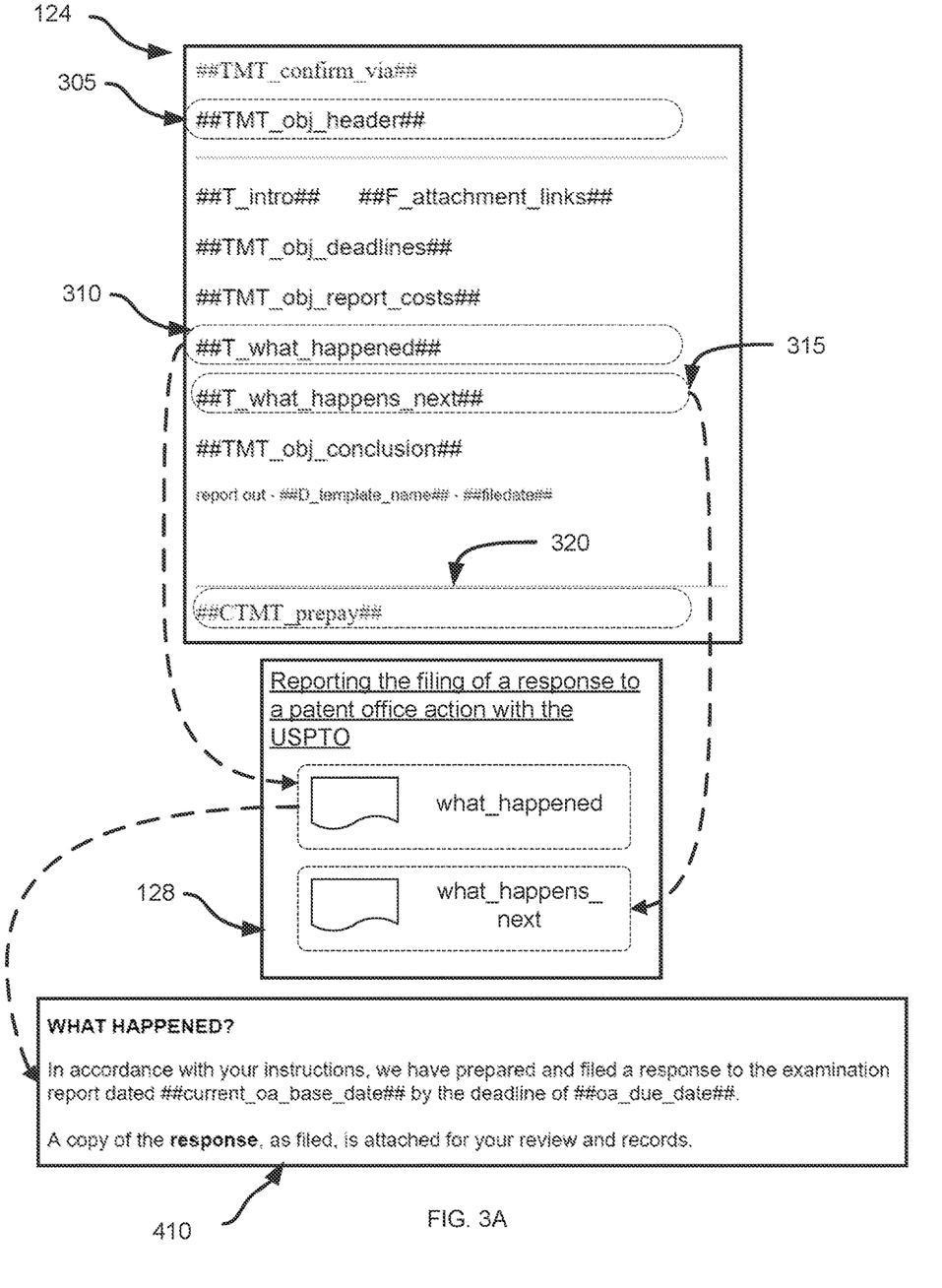
FIGS. 3A, 3B, and 4 depict the determination of data variables for retrieval during performance of the method of FIG. 2.

FIG. 3A illustrates an example of a master template schema 124. Master template schema 124 is comprised of lines of programmed instructions, each instructing the document preparation application 120 to retrieve one or more objects, either from the common pool, or from template schema 128. Template schemas 128 are identified via template identifiers and are repositories of objects that are template specific. Objects are sections of text that can contain data variables to be retrieved by document preparation application 120 from database 156 as instructed by master template schemas 124, and are either retrieved from a common pool of objects or from template schema 128. Objects that are within the common pool can be used by different master template schemas, whereas objects within template schema 128 are template specific.

In the present embodiment, example master template schema 124 represents a reporting letter to a client. In this example, master template schema 124 was determined based on a corresponding template identifier for the reporting of the filing of a response of a patent office action with the USPTO. Programmed instructions 310 is instructing document preparation application 120 to retrieve an object named "what_happened" from within the reporting of the filing of a response of a patent office action with the USPTO template schema 128 (i.e. the template schema 128 corresponding to the template schema identifier retrieved at block 205; in other words, the specific object retrieved as a result of the instructions 310 depends on the template identifier retrieved at block 205). Document preparation application 120 is configured to retrieve the object from within template schema 128 based on the template identifier from block 205 and the "T" prefix, which will be further discussed below. The corresponding "what_happened" template specific object is as shown in object 410. Similarly programmed instructions 315 is instructing document preparation application 120 to retrieve an object named "what_happens_next" from within the same reporting of the filing of a response to a patent office action with the USPTO template schema 128.

Programmed instructions 305 is instructing document preparation application 120 to conditionally retrieve an object named "obj_header" if present within template schema 124, and if not present, to retrieve the object from the common pool of objects. This behavior is based off of the "TMT" prefix.

In the present embodiment, programmed instructions contain prefixes, such as "TMT" within programmed instruction 305, and "T" within programmed instruction 310 and 315. Prefixes within programmed instructions 305, 310 and 315 instruct document preparation application 120 whether to allow for conditional behavior within master template schema 124. Conditional behavior is not limited to master template schemas 124, but can be used within template schemas 128 and objects.

In the present embodiment, programmed instruction 310 and 315 with the prefix "T" instructs the document preparation application 120 that there is no conditional behavior, and that document preparation application 120 should retrieve the object directly from the corresponding template schema 128.

Figure 3B:
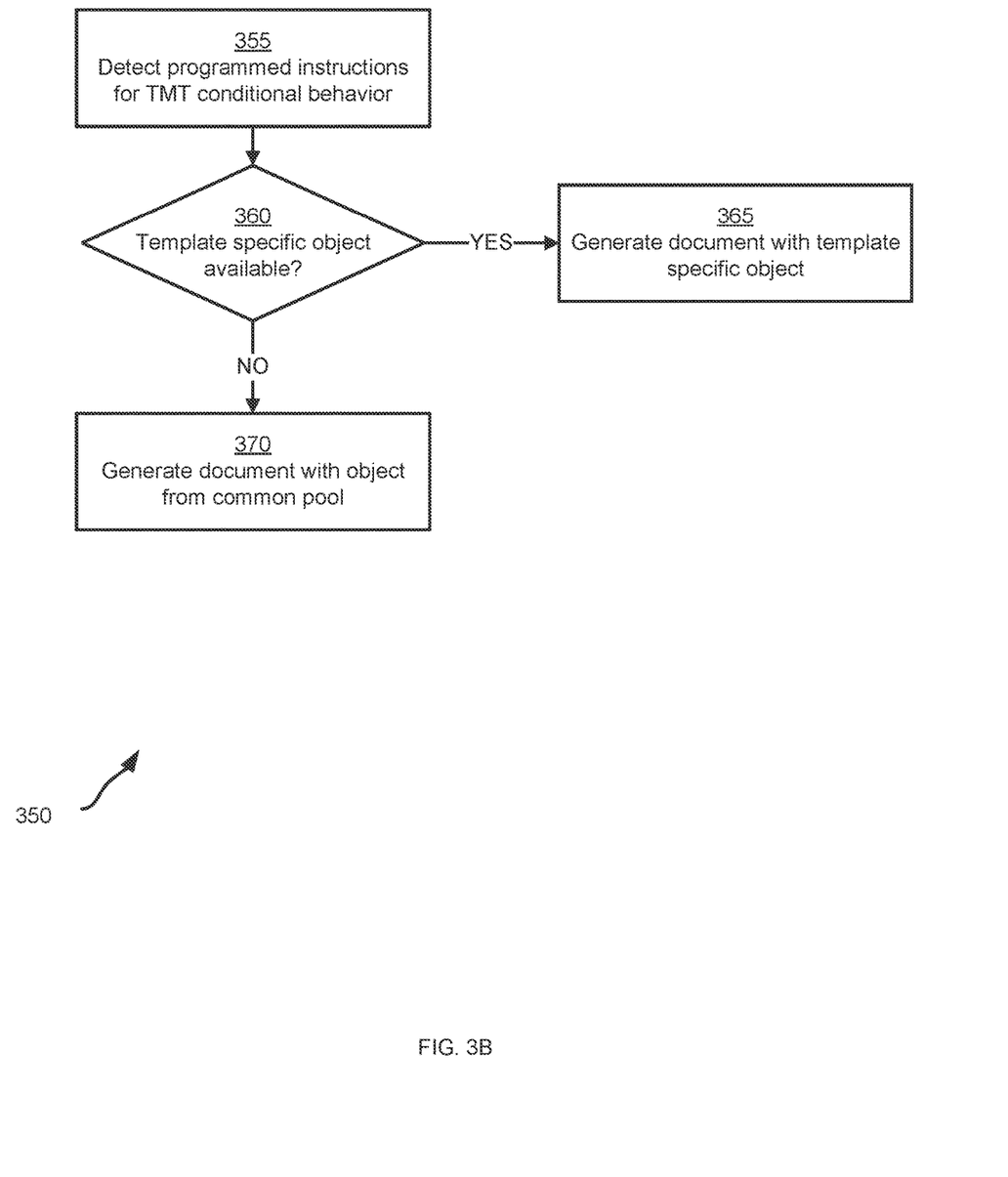

Referring now to FIG. 3B, in the example containing "TMT", the object "obj_header" can be overridden by a template specific object named "obj_header". At block 355, the programmed instructions within master template schema 124 begin the process of determining whether a template specific object is used, or whether an object from the common pool is used. At block 360, document preparation application 120 determines if the specific template schema 128 has a template specific object named "obj_header". If it does, then at block 365, document preparation application 120 uses the template specific object. If at block 360, there is no template specific object named "obj_header", then the document preparation application will default back to the common pool for the object name "obj_header" at block 370.

Referring back to FIG. 3A, programmed instruction 320 contains the prefix "CTMT", which instructs document preparation application 120 to conditionally retrieve an object from the common pool based on a flag within database 156. In the present embodiment, an object is displayed if there is a flag on the case within database 156, showing that the client has paid up front for services. A person skilled in the art will now recognize the combinations allowing for document preparation 120 to retrieve template specific objects from template schema 128, or to retrieve objects from a common pool to be used within master template schema 124 or other embodiments of conditionally retrieving objects from either template schema 128 or a common pool of objects.

A person skilled in the art will also now recognize the variations and combinations on programmed instructions within master template schema 124 in generating a document.

Figure 4:
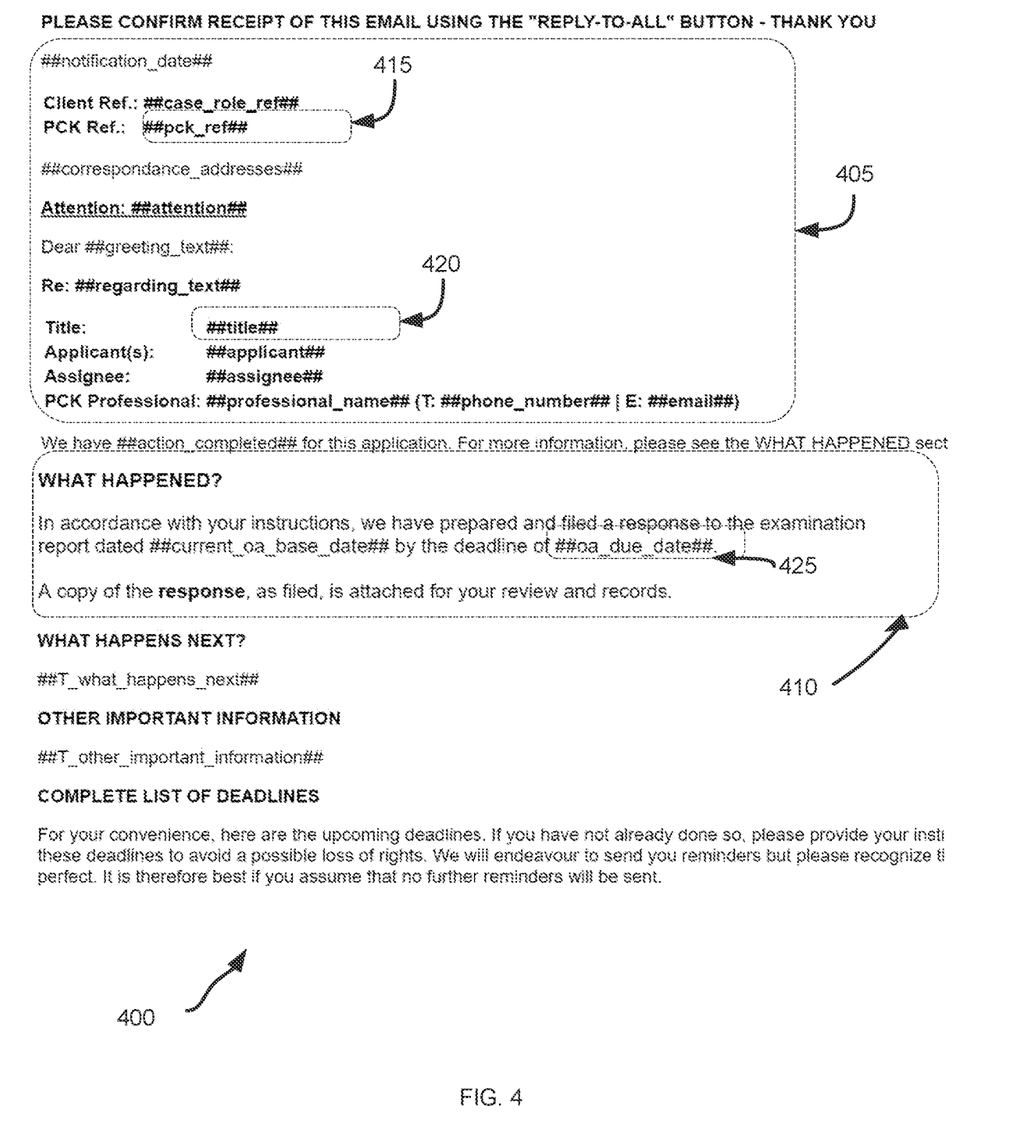

FIG. 4 illustrates an example of a partially generated document based on master template schema 124, after document preparation application 120 has retrieved template schema 128 for reporting the filing of a response to a patent office action with the USPTO, and the respective objects from the common pool of objects. Object 405 corresponds to programmed instructions 305, and depicts the header text as part of the header object. In the present embodiment, the header object is an object from the common pool and as such, can be used by multiple master template schemas 124. Object 410 corresponds to programmed instructions 310, and depicts the template specific text associated with template identifier for reporting the filing of a response to a patent office action with the USPTO. A person skilled in the art will now be able to recognize different objects and template schemas, the architectural relationship between master template schemas 124, template schemas 128, and objects, and how document preparation application 120 is instructed to create the structure of the document.

Data fields 415, 420 and 425 each represent data variables that document preparation application 120 is instructed to retrieve from database 156 by corresponding objects (object 405 instructs data field 415 and 420, and object 410 instructs data field 425). Data variables can be programmed on different schemas, including, but not limited to, master template schema 124, template schema 128, and on objects. In the present embodiment, data field 415 is instructing the document preparation application 120 to retrieve the attorney docket number from database 156. Data field 420 is instructing document preparation application 120 to retrieve the title of the patent from database 156. Data field 425 is instructing the document preparation application 120 to retrieve the deadline to respond to the patent office action to the USPTO from database 156. Data fields 415, 420, and 425 are examples of data variables that need to be retrieved in the present embodiment depicted in schema 400, and a person skilled in the art will now be able to recognize that schema 400 contains other data variables that need to be retrieved from database 156. A person skilled in the art will also now be able to recognize the different data variables that can be used, and their association to master template schemas 124, template schemas 128 and objects.

Returning to FIG. 2, at block 215, document preparation application 120 on processing server 104 retrieves the data variables prescribed by master template schema 124, and objects from either the common pool or from template schema 128, from database 156 on database server 140. The retrieval of the data variables are based on a single record in database, based on the case reference number, which is part of the document initiation data that was received by document preparation application 120.

Figure 5:
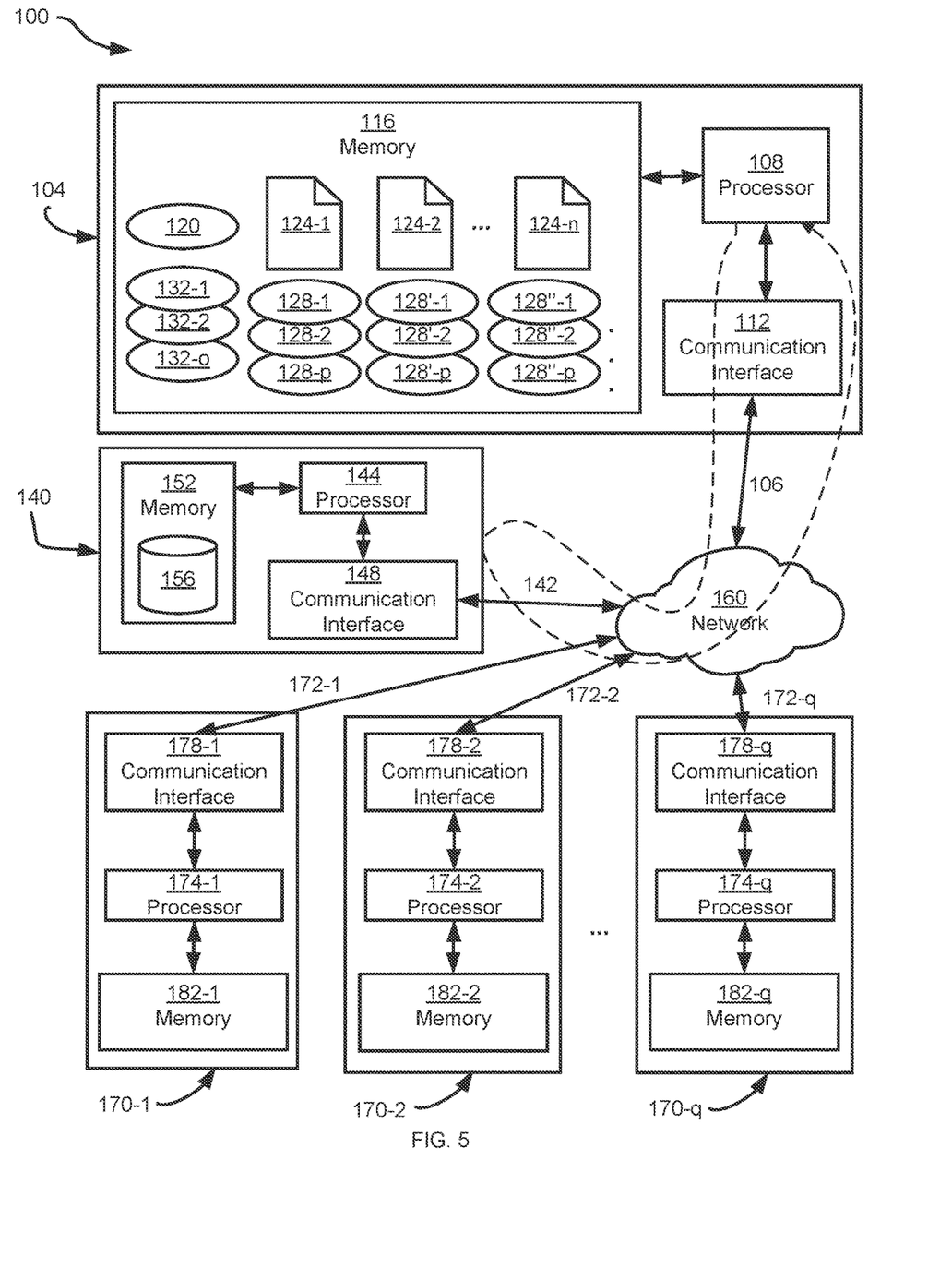
FIG. 5 depicts the retrieval of data from database by the processing server of system of FIG. 1.

FIG. 5 is an example of the retrieval of data variables. For example, if the case reference number that accompanied the data initiation data was an application number 2253200 for a patent filed with the USPTO, then document preparation application 120 will retrieve data variables specific to that case within electronic legal records database 156.

Returning to FIG. 2, at block 220, document preparation application 120 generates the document. Document generation is performed based on master template schema 124, template schema 128, objects and the retrieved data variables from database 156. Document preparation application 120 will also use instructions as provided by behavioral schema 132 in generating the document. At block 225, the generated document is distributed to client device 170.

Behavioral schema 132 is a blueprint that instructs document preparation application 120 on the behavioral characteristics of document generation. For example, behavioral schema 132 can instruct document preparation application 120 to generate the document in hypertext markup language (HTML) file format, and to email the document as part of an email message to client addresses that are retrieved from database 156, to be displayed on client device 170. In another example, behavioral schema 132 can instruct document preparation application 120 to generate the document in a portable document format (PDF) file and upload it to client device 170 to be viewed by a third-party software. A person skilled in the art will now be able to recognize the different possible combinations and sets of characteristics that behavioral schema 132 can be comprised of.

Figure 6:
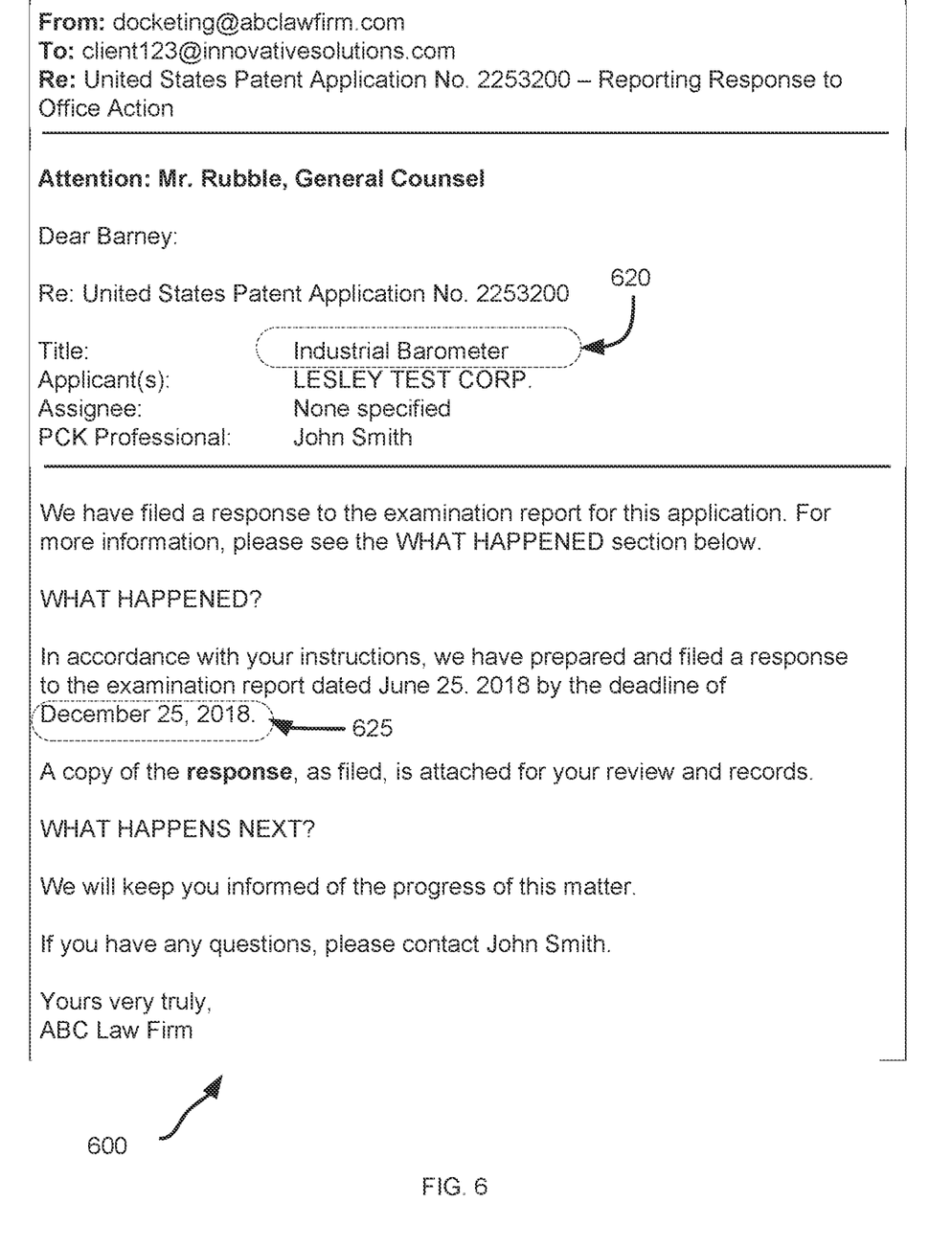
FIG. 6 depicts an email showcasing the resulting generated dynamically generated document as part of performance of the method of FIG. 2.

Referring to FIG. 6, display 600 is an example of a generated document that has been distributed to client device 170 and is being displayed as an email on client device 170. In present embodiment, document preparation application 120 prepared the reporting of the filing of a response to a patent office action at the USPTO with the accompanying behavioral schema 132 of generating the document as an HTML file, and emailed it to client device 170 as part of the body of the email message.

Data fields 620 and 625 are examples of the data variables that document preparation application 120 retrieved from database 156 and generated as part of the document. Data field 620 corresponds to data field 420 from FIG. 4, and data field 625 corresponds to data field 425 from FIG. 4. A person skilled in the art should now be able to recognize the use of data variables throughout method 200 by document preparation application 120.

Figure 7:
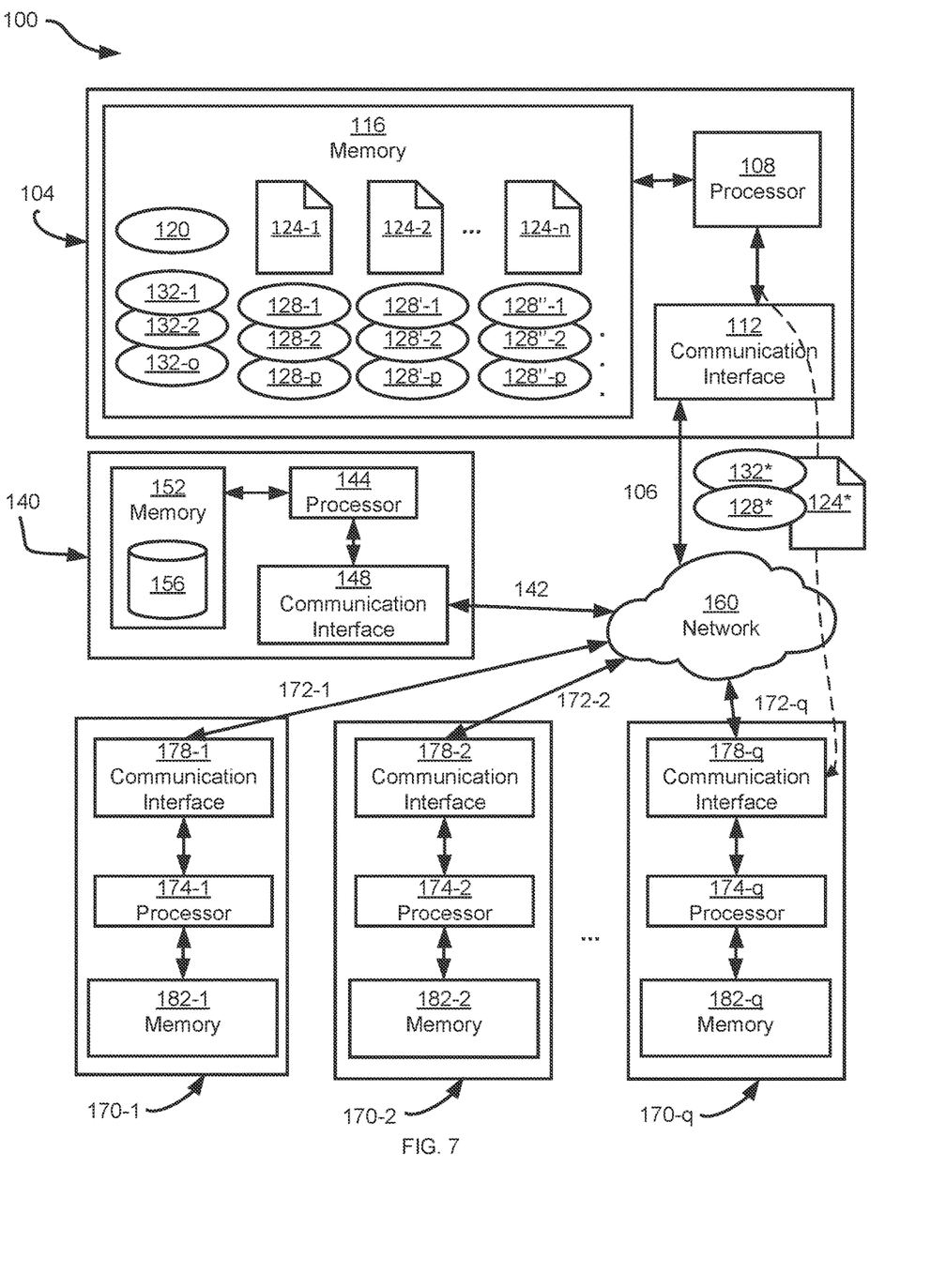
FIG. 7 depicts the distribution of the dynamically generated document to client devices of system of FIG. 1.

FIG. 7 is an example of the generation and distribution of the document. In the present embodiment, the document is a letter reporting the filing of a response to an office action to the USPTO, and is generated by document preparation application 120 using master template schema 124*, template schema 128* and follows instructions within behavioral schema 132*. The finalized generated document is then distributed to the client device 170 based on instructions from behavioral schema 132. A person skilled in the art will now be able to recognize the different combinations and sets of master template schemas 124, template schemas 128 and behavioral schemas 132 that allow for different variations of automated dynamic document generation using method 200 in system 100.

Those skilled in the art will appreciate that in some embodiments, the functionality of any one or more of the applications 120 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method for document generation in a computing device, comprising:
    storing, in a memory:
        (i) a common pool of objects having respective object identifiers,
        (ii) a plurality of templates having respective template identifiers, each template containing, for each of a subset of the object identifiers, a local definition of a corresponding object from the common pool, and
        (iii) a plurality of master templates having respective master template identifiers, each master template containing, for each of a further subset of the object identifiers, an associated string defining object retrieval behavior for the object identifier;
    establishing a connection to a data source;
    detecting, via the connection, initiation data including an active template identifier;
    responsive to the detection, retrieving an active master template identifier associated with the active template identifier;
    for each of the further subset of object identifiers of the master template corresponding to the active master template identifier, retrieving an object from a source selected from either the common pool or a template corresponding to the active template identifier, according to the string; and
    generating a document according to the retrieved objects.

2. The method of claim 1, herein at least one of the common pool of objects defines static document content.

3. The method of claim 1, wherein at least one of the common pool of objects defines dynamic document content.

4. The method of claim 3, wherein the dynamic document content includes a reference to the data source.

5. The method of claim 1, further comprising:
    storing, in the memory, a mapping of template identifiers to master template identifiers;

wherein retrieving the active master template identifier includes retrieving the active master template identifier from the mapping according to the active template identifier.

6. The method of claim 1, further comprising storing behavioral data defining at least one of a format for the document and a transmission mechanism for the document.

7. The method of claim 6, further comprising: responsive to generating the document, transmitting the document according to the transmission mechanism.

8. A computing device, comprising:
a memory storing;
 (i) a common pool of objects having respective object identifiers,
 (ii) a plurality of templates having respective template identifiers, each template containing, for each of a subset of the object identifiers, a local definition of a corresponding object from the common pool, and
 (iii) a plurality of master templates having respective master template identifiers, each master template containing, for each of a further subset of the object identifiers, an associated string defining object retrieval behavior for the object identifier;
a processor interconnected with the memory, the processor configured to:
 establish a connection to a data source;
 detect, via the connection, initiation data including an active template identifier;
 responsive to the detection, retrieve an active master template identifier associated with the active template identifier;
 for each of the further subset of object identifiers of the master template corresponding to the active master template identifier, retrieve an object from a source selected from either the common pool or a template corresponding to the active template identifier, according to the string; and
 generate a document according to the retrieved objects.

9. The computing device of claim 8, wherein at least one of the common pool of objects defines static document content.

10. The computing device of claim 8, wherein at least one of the co on pool of objects defines dynamic document content.

11. The computing device of claim 10, wherein the dynamic document content includes a reference to the data source.

12. The computing device of claim 8, wherein the memory stores a mapping of template identifiers to master template identifiers; and
 wherein the processor is configured, to retrieve the active master template identifier, to retrieve the active master template identifier from the mapping according to the active template identifier.

13. The computing device of claim 8, wherein the memory stores behavioral data defining at least one of a format for the document and a transmission mechanism for the document.

14. The computing device of claim 13, wherein the processor is further configured to: responsive to generating the document, transmit the document according to the transmission mechanism.

15. A non-transitory computer-readable medium storing a plurality of computer-readable instructions executable by a processor of a computing device to:
store:
 (i) a common pool of objects having respective object identifiers,
 (ii) a plurality of templates having respective template identifiers, each template containing, for each of a subset of object identifiers, a local definition of a corresponding object from the common pool, and
 (iii) a plurality of master templates having respective master template identifiers, each master template containing, for each of a further subset of the object identifiers, an associated string defining object retrieval behavior for the object identifier;
establish a connection to a data source;
detect, via the connection, initiation data including an active template identifier;
responsive to the detection, retrieve an active master template identifier associated with the active template identifier;
for each of the further subset of object identifiers of the master template corresponding to the active master template identifier, retrieve an object having the object identifier in the instruction, from a source selected from either the common pool or a template corresponding to the active template identifier, according to the string; and
generate a document according to the retrieved objects.

16. The non-transitory computer-readable medium of claim 15, wherein at least one of the common pool of objects defines static document content.

17. The non-transitory computer-readable medium of claim 15, wherein at least one of the common pool of objects defines dynamic document content.

18. The non-transitory computer-readable medium of claim 17, wherein the dynamic document content includes a reference to the data source.

19. The non-transitory computer-readable medium of claim 15, wherein the instructions are further executable by the processor to:
 store a mapping of template identifiers to master template identifiers;
 in order to retrieve the active master template identifier, retrieve the active master template identifier from the mapping according to the active template identifier.

20. The non-transitory computer-readable medium of claim 15, wherein the instructions are further executable by the processor to:
 store behavioral data defining at least one of a format for the document and a transmission mechanism for the document; and
 responsive to generating the document, transmit the document according the transmission mechanism.

* * * * *